W. C. FREEMAN.
Improvement in Boring-Machines.

No. 132,393.  Patented Oct. 22, 1872.

Witnesses:
E. Wolff
C. Sedgwick

Inventor:
Wm. C. Freeman
per Munn & Co.
Attorneys.

2 Sheets--Sheet 2.
W. C. FREEMAN.
Improvement in Boring-Machines.
No. 132,393. Patented Oct. 22, 1872.
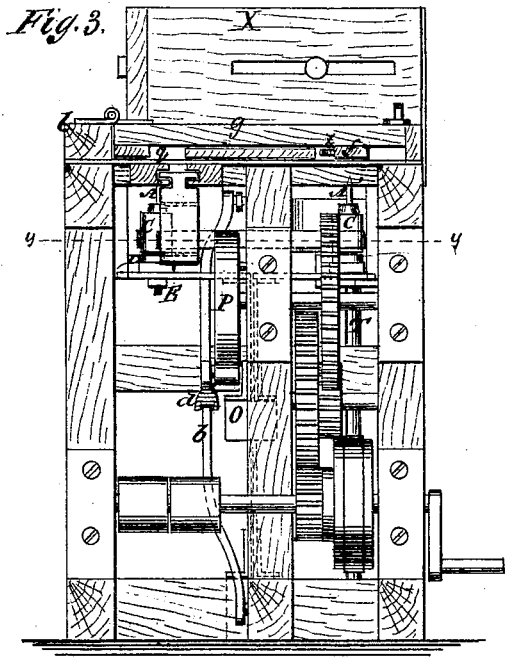
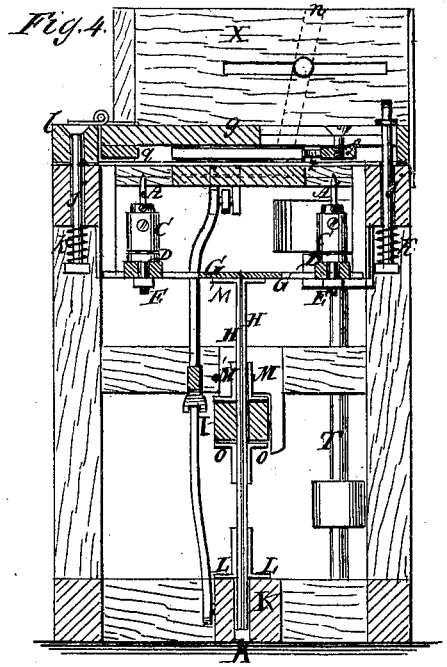
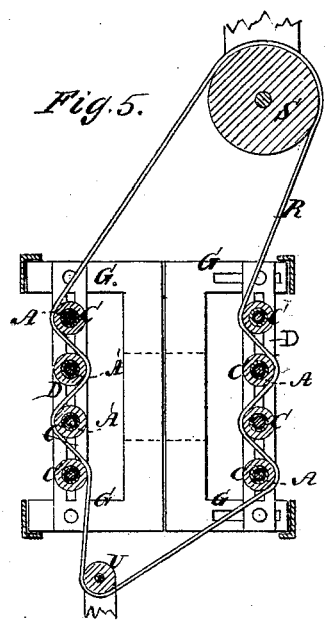
Witnesses:
E. Wolff
C. Sedgwick
Inventor:
Wm. C. Freeman
per
Attorneys.

UNITED STATES PATENT OFFICE.

WILLIAM C. FREEMAN, OF LOUISIANA, MISSOURI.

IMPROVEMENT IN BORING-MACHINES.

Specification forming part of Letters Patent No. 132,393, dated October 22, 1872.

*To all whom it may concern:*

Be it known that I, WILLIAM C. FREEMAN, of Louisiana, in the county of Pike and State of Missouri, have invented a new and Improved Wood-Boring Machine, of which the following is a specification:

My invention consists of one or two gangs of boring-tools arranged on a vertically-adjustable support and provided with driving-belts for the tools and apparatus for raising and lowering the tools while in operation, with automatic feeding-gear, a hopper, guides, and holder for the stuff to be bored, all so arranged that the feeder pushes a board from the bottom of the hopper along the guides to the holder over the gangs of boring-tools, which then come up and bore the board along one or both edges at the same time that the feeder goes back for another board, and then go down before the feeder comes forward again with the next board and ejects the first by the next, and so on. The hopper, guides, holder, and the tools are adjustable to boards of different sizes, all as hereinafter described.

Figure 1:
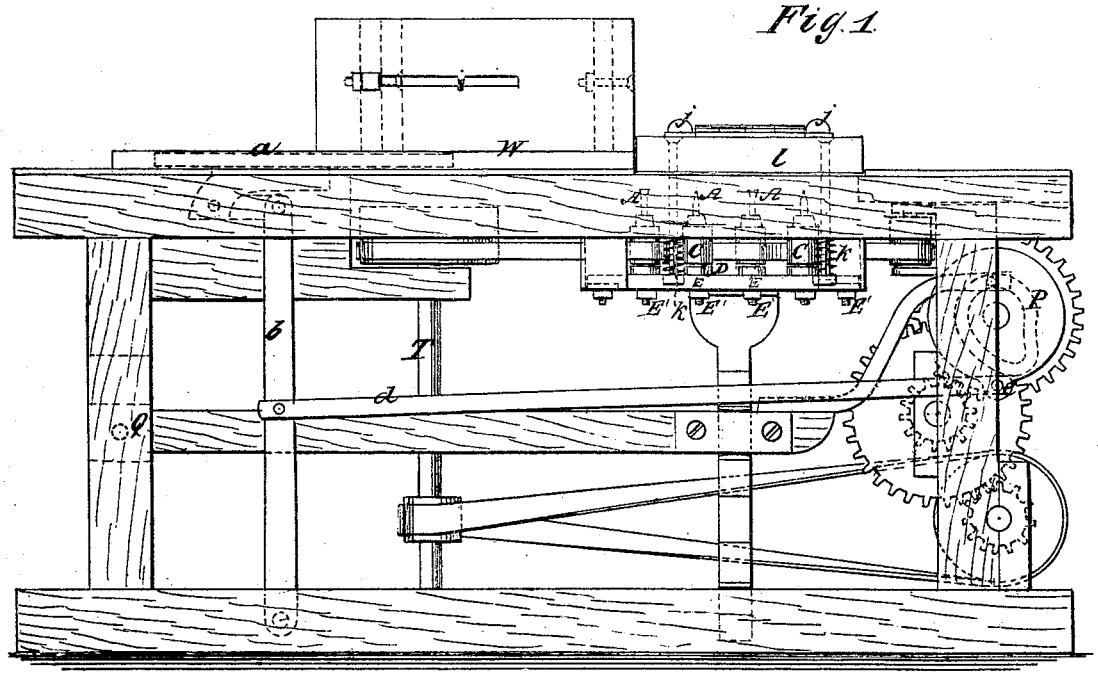
Figure 2:
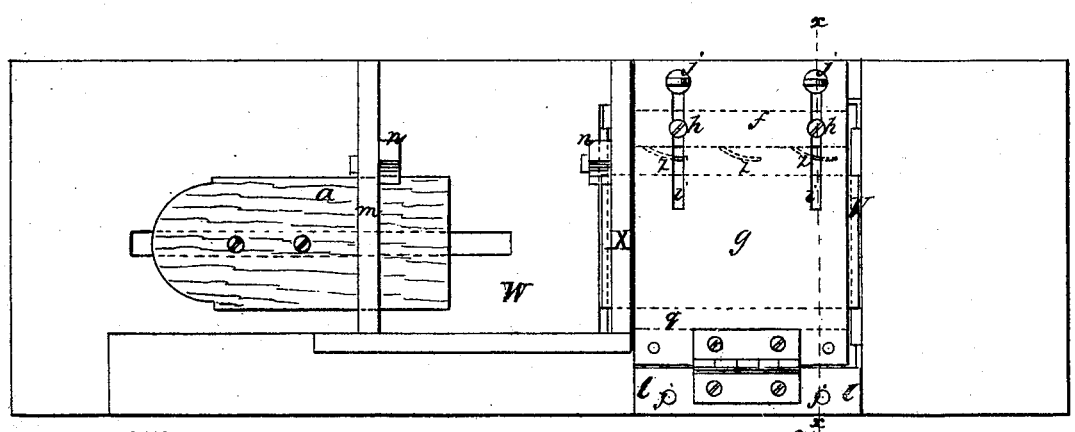

Figure 1 is a side elevation of my improved boring-machine. Fig. 2 is a plan view. Fig. 3 is an end elevation. Fig. 4 is a transverse section taken on the line $x\,x$ of Fig. 2. Fig. 5 is a horizontal section taken on the line $y\,y$ of Fig. 3.

Similar letters of reference indicate corresponding parts.

A and A' represent two series of vertical boring-tools, attached to belt-pulleys C, which are mounted on horizontal slotted bars D by collars E and bolts and nuts E', so that they can be shifted along said bars to adjust them at different distances apart, and said bars D are mounted on supports G, which are slotted at right angles to the slots of said bars so that they can be adjusted toward or from each other to adjust the tools to bore along the edges of wide or narrow boards. The supports G, which may be connected together in one, I prefer to make separate, or in two parts, for using either one or both series of boring-tools, as I may require. These supports are mounted on vertical bars H, which pass down through the lifting-beam I into a guide-socket, K, in the platform, and they have feet L resting on the top of the platform. One is fastened to said beam I by a pawl, M, which may be turned up, so that when the beam rises it will not rise, but when said pawl is turned down it will rise with the beam the same as the other one, which is provided with a permanent flange, M'. Both bars H have a flange, O, below the beam, by which it forces them down. This beam is raised and lowered for presenting the tools to the work above them and withdrawing them again by the cam-wheel P, with which one end engages by a pin in the slot of said wheel, the other end being pivoted to the frame at Q. These tools are revolved by the belt R running from a pulley, S, on the vertical shaft T, round their pulleys and an idle pulley, U, as represented in Fig. 5. The boards to be bored are piled in a hopper, W, on the top of the frame beyond the tools, and are pushed one at a time from the bottom of the pile through a slot in the bottom of the side X onto the narrow bed-piece V, between permanent and spring guides by the pusher $a$, which is brought against the end of the bottom board of the pile by the lever $b$, connecting-rod $d$, and a crank-pin, $e$, on the cam-wheel P. The spring-guides Z are attached to a movable bar, $f$, which is clamped to the under side of the holding-plate $g$ by screws or bolts $h$ passing through slots $i$, by which said bar can be adjusted toward or from the permanent guide for wide or narrow boards. This holding-board $g$ is arranged as far above the bed-piece V as the thickness of the thinnest boards to be treated, and it is held down on its rest by the bolts $j$ and coiled springs $k$, which allow it to rise when thicker boards are pushed under it. At one side said holder is hinged to a piece, $l$, through which the bolts $j$ of that side pass, so that it can be raised up readily on detaching the bolts $j$ of the other side to have access to the tools. The side board $m$ of the hopper is adjustable toward and from the side $x$ for boards of different lengths, and cleats $n$ are used on the front side of the hopper instead of a side board, which said cleats are also adjustable toward and from the opposite side board for wide or narrow boards, said cleats being bolted to the sides $x$ and $m$, by bolts passing through slots, by which to effect said adjustment.

With this machine nail or screw holes may be bored along one or both edges of a board for boxes, &c., with great rapidity, the said boards being automatically presented to and removed from the place where the boring-tools come to them to perform their work, and said tools, the hopper, guides, &c., can be readily adjusted for boards of different sizes.

Having thus described my invention, I claim as new, and desire to secure by Letters Patent—

1. The combination of the automatic feeding apparatus, the holding apparatus, and one or more series of boring-tools, arranged and adapted for feeding, holding, and boring boards for boxes, substantially as described.

2. The combination of the top-holder $g$ having the fixed guide $q$ and the adjustable bar $f$ having its spring-guide Z with the detachable bed V, as and for the purpose described.

3. The boring-tools mounted in the slotted bars D and the latter on the slotted supports G for adjusting said tools to the lengths and widths of the boards, substantially as specified.

4. The support G, arranged in two parts and one or both connected with the lifting-beam I by a shifting connection, M, to be raised or not, substantially as specified.

WILLIAM C. FREEMAN.

Witnesses:
   JAMES C. BOOTHE,
   B. F. PARSONS.